United States Patent [19]

Gieles et al.

[11] Patent Number: 4,746,789

[45] Date of Patent: May 24, 1988

[54] READING DEVICE FOR BAR CODES

[75] Inventors: Antonius C. M. Gieles; Hendrikus P. M. Sterken; Willem J. Venema, all of Eindhoven, Netherlands

[73] Assignee: U.S. Philips Corporation, New York, N.Y.

[21] Appl. No.: 791,857

[22] Filed: Oct. 28, 1985

[30] Foreign Application Priority Data

Nov. 2, 1984 [NL] Netherlands ............... 8403323

[51] Int. Cl.[4] .............................................. G06K 7/10
[52] U.S. Cl. .................................... 235/463; 235/462
[58] Field of Search ................................ 235/462, 463

[56] References Cited

U.S. PATENT DOCUMENTS

| 4,323,772 | 4/1982 | Serge | 235/463 |
| 4,500,776 | 2/1985 | Laser | 235/462 |
| 4,514,622 | 4/1985 | Wevelsiep et al. | 235/463 |
| 4,602,152 | 7/1986 | Dittakavi | 235/463 |

Primary Examiner—David L. Trafton
Attorney, Agent, or Firm—Jack E. Haken; James J. Cannon; Anne E. Barschall

[57] ABSTRACT

The code is scanned along at least four non-coincident parallel lines in a bar code reading device. The actual processing is started when a margin of sufficient width is detected. The width of the bar is counted and the width found is used to address a table memory. This results in a width indication for a valid bar and a reset signal for an invalid bar. There is provided an bar counter which counts the bars and which addresses a bar memory in order to store the bar identification therein. When the reset signal is received, the series of bar identification received thus far for the relevant line is invalidated, unless all bars of a complete code have already been received. During validation a check is performed as regards correct contents and possibly correspondence between two potentially correct bar codes found.

16 Claims, 3 Drawing Sheets

FIG.5       PROM D11 82S131

| ADDRESS | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 2 | 0 | 0 | 0 | 1 | 1 | 1 | 1 | 1 | 1 | 1 | 1 | 2 | 2 | 2 | 2 |
| 1 | 2 | 2 | 2 | 2 | 2 | 2 | 2 | 2 | 2 | 2 | 2 | 2 | 2 | 2 | 2 | 2 |
| 2 | 2 | 0 | 0 | 0 | 1 | 1 | 1 | 1 | 1 | 1 | 1 | 1 | 1 | 1 | 2 | 2 |
| 3 | 2 | 2 | 2 | 2 | 2 | 2 | 2 | 2 | 2 | 2 | 2 | 2 | 2 | 2 | 2 | 2 |
| 4 | 2 | 0 | 0 | 0 | 0 | 1 | 1 | 1 | 1 | 1 | 1 | 1 | 1 | 1 | 1 | 1 |
| 5 | 1 | 2 | 2 | 2 | 2 | 2 | 2 | 2 | 2 | 2 | 2 | 2 | 2 | 2 | 2 | 2 |
| 6 | 2 | 2 | 0 | 0 | 0 | 0 | 2 | 1 | 1 | 1 | 1 | 1 | 1 | 1 | 1 | 1 |
| 7 | 1 | 1 | 1 | 1 | 1 | 1 | 2 | 2 | 2 | 2 | 2 | 2 | 2 | 2 | 2 | 2 |
| 8 | 2 | 2 | 0 | 0 | 0 | 0 | 0 | 2 | 2 | 1 | 1 | 1 | 1 | 1 | 1 | 1 |
| 9 | 1 | 1 | 1 | 1 | 1 | 1 | 1 | 1 | 1 | 1 | 1 | 2 | 2 | 2 | 2 | 2 |
| A | 2 | 2 | 2 | 0 | 0 | 0 | 0 | 0 | 0 | 2 | 2 | 1 | 1 | 1 | 1 | 1 |
| B | 1 | 1 | 1 | 1 | 1 | 1 | 1 | 1 | 1 | 1 | 1 | 1 | 1 | 1 | 1 | 2 |
| C | 2 | 2 | 2 | 0 | 0 | 0 | 0 | 0 | 0 | 0 | 0 | 2 | 2 | 1 | 1 | 1 |
| D | 1 | 1 | 1 | 1 | 1 | 1 | 1 | 1 | 1 | 1 | 1 | 1 | 1 | 1 | 1 | 2 |
| E | 2 | 2 | 2 | 2 | 0 | 0 | 0 | 0 | 0 | 0 | 0 | 0 | 0 | 0 | 2 | 2 |
| F | 2 | 1 | 1 | 1 | 1 | 1 | 1 | 1 | 1 | 1 | 1 | 1 | 1 | 1 | 1 | 2 |

READING DEVICE FOR BAR CODES

BACKGROUND OF THE INVENTION

1. Field of the Invention

The invention relates to a bar code reading device. Such a reading device for a bar code provided in or on a carrier includes a scanning device for line-wise scanning the bar code, a decision element connected to the scanning device to form a bivalent signal from the signal of the scanning device, a code regenerator connected to the decision element to form a code sequence consisting of valid bar widths from the lengths of successive intervals of the bivalent signal, a bar counter counted to an output of the code regenerator in order to count the number of valid bars, and an output element connected to the code regenerator to validate a code sequence and to present a validated code on a user output. Bar codes can be distinguished on the basis of their contents. The first type of code identifies a type of product, for example products sold in supermarkets. The second type of code identifies a product, for example the sequnce number within a number of products of the same type.

2. Description of the Prior Art

A bar code reading device is known from European Patent Application No. 36951 and the corresponding U.S. Pat. No. 4,323,771. The code may be printed on a carrier, but may also be provided in a carrier by punching, etching, etc. The known device utilizes a line scanning camera, for example a Fairchild Model CCD 1410. The lengths of the intervals are compared with two thresholds for the detection of narrow, wide and impossibly wide (out-of-range and hence invalid) bars. However, it has been found that various invalid bars are still accepted. Furthermore, the threshold is adjusted first, and a detection scan can be performed only after that.

SUMMARY OF THE INVENTION

It is an object of the invention to provide a particularly reliable reading device for which purpose a large amount of raw information is derived from the carrier so that reliable and fast data reduction is required, and which also satisfies the following requirements:

the movement of the bar code with respect to the stationary scanning device may not have an adverse effect;

the scanning device must be inexpensive and readily available;

the reading device may hardly be influenced by the angle between the scanning direction and the nominal scanning direction (perpendicular to the direction of the bars);

the reading device may hardly be influenced by a scale variation of the bar code as may be caused by a variable distance between the carrier and the scanning device;

the reading device may hardly be susceptible to minor mutilations of the bar code on the carrier.

The processing speed is high because a variety of irrelevant information is ignored at an early stage of data processing; for example, the position of the code need not always be known in advance.

To achieve this, the reading device in accordance with the invention has the following improvements. The code regenerator includes an address counter for a table memory which counts down the lengths of the intervals, the table memory identifying a valid bar width in the location thus addressed or indicating an invalid bar width. The table thus addressed has a validity range of at least two successive address counter positions for each nominal bar width, the address range of the table memory covering at least two different sequences of consecutively successive invalid counter positions which are separated from one another by at least one sequence of valid counter positions. The table memory contains a sequence of at least two tables of increasing scale, for each table there being provided for each nominal bar width a tolerance range between a largest permissible actual bar width and a smallest permissible actual bar width, said tolerance range amount to at least a factor $1\frac{1}{2}$. There are in principle three feasible ranges of invalid bar widths:

a. too narrow, even though the width is larger than the value corresponding to one pixel; the described state of the art includes means for rejecting bars having a width of one pixel; in accordance with the invention, this minimum width can be adjusted in a flexible manner;

b. between two valid width ranges, so that additional protection is obtained for given linear scale factors;

c. too wide, in which case the realization involving the addressing of a table memory is more flexible than the adjustment of a fixed threshold. Depending on the application, the table memory may be a read-only memory (ROM), a programmable read-only memory (PROM) or another memory.

Invariably at least two of the above invalid ranges have been implemented simultaneously.

When bar widths are continually detected, the bar counter is preferably reset to a starting position per line under the control of an invalid bar width, said resetting being deactivated as soon as a predetermined bar counter position is reached. Resetting is preferably omitted when a sufficient number of valid bars have been found. It may be that at the start a "bar" is found which has the correct width but which has been caused by soiling. In that case an incorrect sequence of bars will have been found when the predetermined number of bars is reached. This can be detected when the information contents are incorrect, for example on parity grounds. A processor can ignore the first bar and take into account an additional bar at the end of the sequence, possibly for as long as necessary to find a correct bar sequence. The resetting of the bar counter is omitted also when an invalid bar occurs after the end of a bar sequence. This is because the bar sequence may then already be a correct sequence. The two cases form the opposite member of one another; both cases are correctly treated by the same step: resetting can take place only if an invalid bar occurs "in the middle of" a bar sequence. The reliablility is thus further enhanced.

Preferably, said minimum number has a fixed value which is larger than one, the output element being suitable to present at least two corresponding codes which are correct as regards contents as validated information on the user output. The correspondence between two validations offers additional protection.

Further attractive embodiments are defined in the appended dependent claims.

BRIEF DESCRIPTION OF THE FIGURES

The invention will be described in detail hereinafter with reference to some Figures.

FIG. 5 shows an example of the contents of the table memory;

THE OPERATING PRINCIPLE

Figure 1:
FIG. 1 shows an example of a bar code.

For correct operation of the device it suffices for the bars to extend more or less perpendicularly to the scanning direction. The bar code carrier may have different forms, for example a sheet with text, a product during its manufacturing stage such as a bulb for a television picture tube, or a printed circuit board. The code can be provided on the carrier either directly or by way of a label. For optimum processing of the code, the information picked up is preprocessed before the actual validation takes place. In this respect FIG. 1 shows an example of a bar code involving two different widths for the bright as well as the dark intervals. In given cases a bar code may consist of colours other than black and white. The box shown in the Figure includes a wide portion without transitions at the beginning and the end of the code. This width amounts to at least twice the nominal bar width. It is to be noted that the scale of the code need not necessarily be known in advance.

In order to distinguish the bar code from the background, the following characteristic properties are used:

a bar code comprises a series of black and white bars which belong to one of the permissible categories (in this case either wide or narrow, but more categories are also feasible);

the ratio of the widths of the various categories is known; in this case the ratio is between 2 and 3;

successive scanning lines are expected to produce corresponding patterns;

at the beginning and at the end there is provided a white strip having a width which amounts to more than twice the width of a "wide" bar;

the number of digits/letters of the message or number used is known in advance and the number of bars can be calculated therefrom;

the widths of the bars may lie in a comparatively large range of values, depending on the printing density and the optical magnification used.

When a television camera is used as the scanning device, in the processing circuit the video signal is applied, via a video amplifier, to a so-called "syncslicer/-separator" which extracts the synchronization signals and which enables the further line-wise processing. Moreover, for the further processing the signal is converted into a bivalent signal. The width of the bars is determined by counting 16 MHz clock pulses between successive transitions of the binarized video signal. Using a series of 8 or 16 selectable tables, the interval widths thus measured are discriminated as being "narrow", "wide" and "inadmissible" bars, respectively. "Inadmissible" may means "too narrow", "too wide" or "between a narrow and wide bar". When a narrow or wide bar is detected, the associated information (in this case 1 bit) is stored in an appropriate memory. Moreover, the number of valid bars is counted and stored in a bar indicator memory for later use. Only those scanning lines are saved for which the expected number of bars was found without interruption of this number by one or more "inadmissible" ("out-of-range") bars. When the number of valid bars found was too small, the relevant information is erased until a valid scanning line comprising the correct number of bars is found. Depending on the length of the bars, the number of valid lines to be found for later validation is permanently adjusted to 4, 8 or 16 (other values may also be used). When this preset number is reached, an interrupt signal is produced and the validation operation is started. Background noise is thus successfully filtered out and, moreover, only a small number of scanning lines will be further processed so that the overall speed is increased.

When use is made of a solid-state line scanner, the foregoing can be realized in the same way. Such a solid-state scanner is constructed to have, for example 1000 scanning elements, each of which scans one pixel of the carrier. The 1000 information elements are then output via a shift organization utilizing charge-coupled transfer. In this case only one scanning line is realized for each position of the scanning device relative to the carrier. When a relative movement is introduced between the scanning device and the carrier, more lines can be scanned. This movement should notably have a component in the longitudinal direction of the bars. The further processing of the signal may be analogous to the case involving a television camera, except for the extraction of the line and frame synchronization signals. The synchronization is now derived directly from the first scanning element.

DESCRIPTION OF A PREFERRED EMBODIMENT

Figure 2:
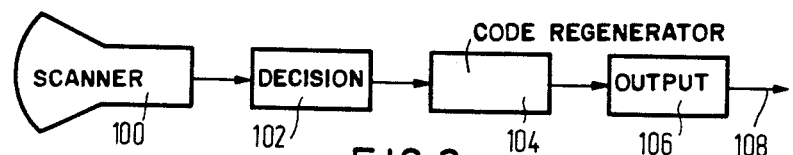
FIG. 2 shows a simple block diagram of a reading device.

FIG. 2 shows a simple block diagram of the reading device. Element 100 is the scanning device which outputs a scanning signal. Element 102 is a decision element which outputs a bivalent signal with transitions between the two signal levels. Element 104 is a code regenerator which measures the length of the intervals of the bivalent signal and which forms a bit series therefrom; using the code of FIG. 1, each bit is capable of indicating whether the bar is wide or narrow. Element 106 is an output element; this element validates a code sequence, for example the representation of a character must satisfy given conventions regardless of identity. For this purpose use can be made of, for example a 2-out-of-5 code so that it is checked whether such a code is indeed present. Furthermore, at a higher level there may be included, for example a CRC or other parity-like facility or even error correction when an adequate amount of redundancy is added. The treatment in the element 106 can be performed by special components. In another version it has been found that the processing under program control in conventional components is particularly attractive, for example in a host computer.

DETAILED DESCRIPTION OF THE PREFERRED EMBODIMENT

Figure 3:
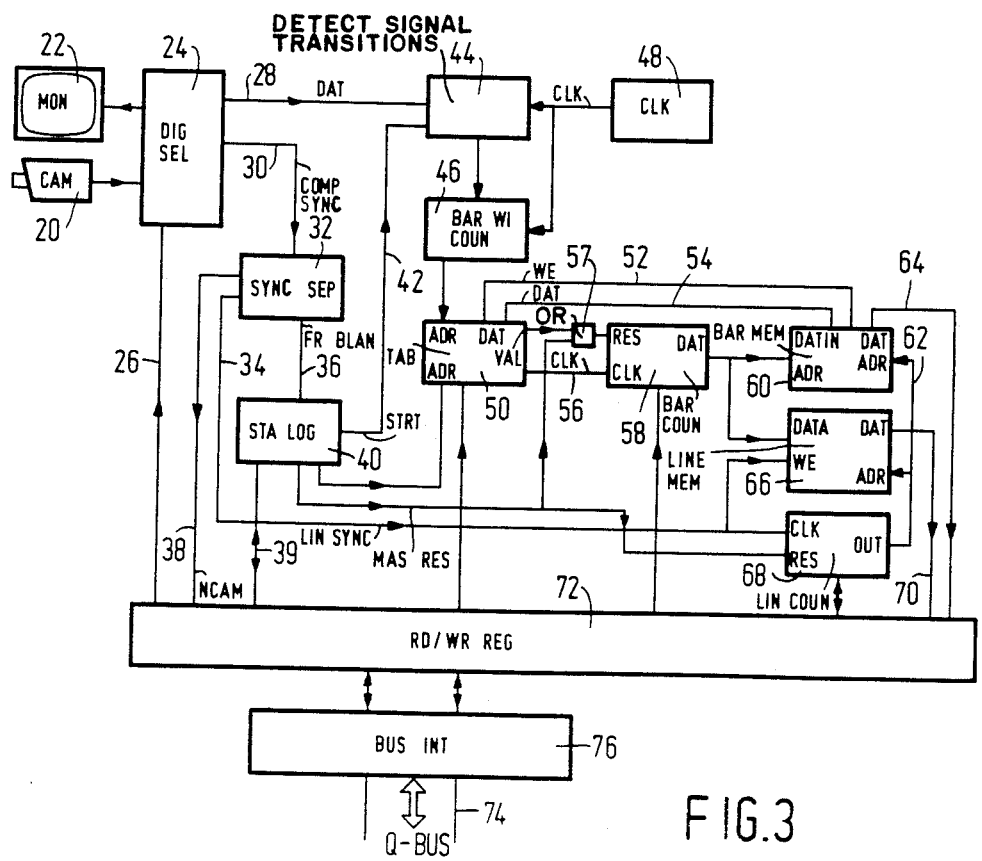
FIG. 3 shows a more detailed block diagram of a reading device in accordance with the invention.

FIG. 3 shows a simple block diagram of a preferred embodiment of a device in accordance with the invention. The scanning device 20 scans the bar code along parallel lines. The scanning device is preferably formed by a television camera because such a camera is inexpensive. The camera scans the image along a large number of lines and special attention is paid to data reduction at an early stage of data processing as will be described hereinafter. The television lines extend more or less transversely of the bars. The code shown in FIG. 1 represents four alphanumerical characters (C-A-R-D). Eight lines of valid information must be derived in order to perform the further validation thereon. The angle between the scanning direction and the nominal scanning direction must in this case be smaller than approximately arctg ¼. The spacing of the lines in the longitudinal direction of the bars may not be excessively large. The spacing in the longitudinal direction of the bars must preferably be at least so large that 1/10 of this length is covered. However, this is not always necessary. In the foregoing example the number of scanning lines to be further validated may be different, for example between 4 and 8 or also larger than 8. It is also possible to use an array camera constructed by means of solid-state technology.

Element 22 in the Figure is a monitor for the inspection of the video signal. Element 24 is a selector for the arbitrary (or alternate) selection of different cameras under the control of a selection signal on line 26. For the sake of simplicity, only one camera is shown. Furthermore, the element 24 acts as a decision element for outputting a binary signal on line 28; ultimately a composite synchronization signal as known from the television technique is output on line 30. Element 32 is a synchronization separator which outputs the line synchronization signal on line 34 and the frame synchronization signal on line 36. On line 38 it outputs a signal which indicates (in appropriate circumstances) that no operational camera is present. Element 40 can receive an activation signal on line 39, for example from a host computer and comprises the starting logic circuitry. It outputs a start signal on line 42 in order to activate element 44. Each examination of a frame requires a start signal on line 39. The signal NCAM on line 38 becomes high under the control of the absence of the composite synchronization signal.

The element 44 forms part of the decision element and detects the signal transitions on the line 28. Element 46 is a counter which counts the lengths of the signal intervals (high and low) and which is synchronized by a clock 48.

Element 50 is the table memory which is addressed by the counts from the element 46. When an admissible bar width is detected, a write enable signal appears on line 52, a data signal appears on line 54, and an increment signal appears on line 56. Element 58 is a bar counter which is incremented each time when a bar having an admissible width is detected. The bar counter position forms an address for the memory 60 which stores the bar codes in the form of a series of bits. When an invalid or inadmissible bar width is received, the table memory 50 applies a reset signal to the bar counter 58 via OR-gate 57, so that the bit series formed thus far for the relevant scanning line is ignored and erased. This simple mechanism offers a substantial data reduction, so that the further validation is simplified and accelerated. This counter also has a facility (not separately shown) which compares the number of valid bars with an external standard value. When the number of successively detected valid bars on the line is sufficient, the reset mechanism is deactivated; however, a "ready" signal (not separately shown) is then issued, so that the code thus found is no longer modified.

The memory 60 has a capacity of 4k 1-bit locations and is capable of storing the information of 16 scanning lines of at most 256 bars each. The counter 58 comprises two cascade-connected 4-bit counters.

For the memory 60 the 8 least-significant address bits are supplied by the counter 58, the four most-significant bits being supplied by the counter 68 as will be described hereinafter. The line memory 66 has a capacity of 16 8-bit locations. This memory does not require a separate reset facility, because no more than one valid code can be found on each scanning line. Thus, bar codes or mutually different numbers of characters can be selected in an intermingled manner. The bar code from the memory 60 and the number of bars from the memory 66 can be selectively fetched by the host computer via line 70. The write control signal for the memory 66 is derived from the synchronization separator 32.

Element 68 is a four-bit counter which provides the addressing of the line memory 66 or the four most-significant address bits for the memory 60. Resetting is initiated by the start logic circuitry of the element 40. The increment signal is derived from the line synchronization by the element 32, but only if a valid bar number has been counted by the counter 58. The relevant enable connection is not separately shown. Thus, a number of at the most 16 lines is to be processed for further validation, for example under program control in the host computer. To this end, the line counter 68 can be filled from a battery of read/write registers provided for this purpose and the memories 60, 66 can be read. Connection to the computer bus 74 is realized by way of a known interface 76. The counter 58 can thus be preset. The read/write registers which are block-wise denoted by the reference numeral "72" serve for the storage of a three-bit selection signal on the line 26, the signal NCAM, the information for the start logic circuitry 40, a three-bit table selection signal for the table memory 50, a data signal (8 bits) for the counter 58, a data signal (4 bits) for the counter 68, an 8-bit data signal from the line memory 66, and a 4-bit output signal from the bar memory 60. The registers are connected to a bus interface 76 which is connected to the computer bus 74. The contents of this register can thus be exchanged with this computer in the one and/or the other direction.

Figure 4:
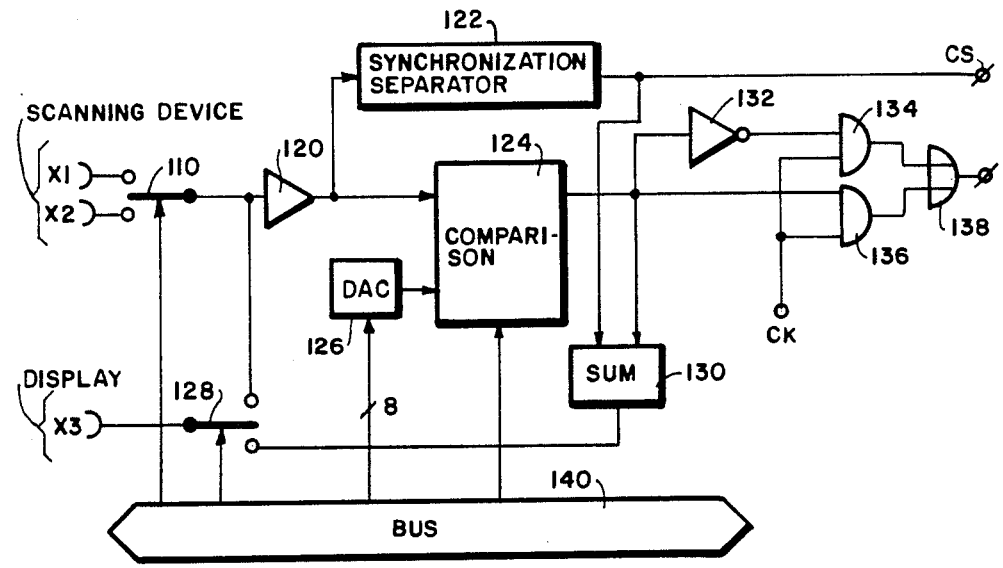
FIG. 4 shows a further block diagram concerning the decision element and the code regenerator.

FIG. 4 shows a further block diagram concerning the decision element and the code regenerator. There are provided two inputs x1, x2 for respective scanning devices. This facility can be extended in a similar way for a larger number of scanning devices. The selection signal for the multiplex circuit 110 is received from bus 140. Element 120 is a video amplifier. Element 122 is the snychronization separator (see also element 32 in FIG. 4). This element supplies the synchronization signal CS. Element 126 is a digital-to-analog converter which is connected to the bus 140 via an 8-bit line. A reference level is thus determined. Element 124 is a comparison circuit which includes two analog inputs for forming the actual black/white signal. Various algorithms have already been disclosed for the formation of a varying comparison level. A summing circuit 130 is connected to the outputs of the elements 122, 124. The sum signal can be used (as the signal x3 received from the input selected at 128), for example for display on the monitor 22 of FIG. 3. Element 132 is an inverter. Elements 134, 136 constitute two AND-gates. These gates receive a clock signal CK; their output signals are combined, by way of the OR-gate 138, for presentation to the counter 46 in FIG. 3.

FIG. 5 shows the contents of the memory 50 of FIG. 3. This memory contains 256 addressable locations of at least two bits. Use is made of an element of the type 82S131 which is a programmable read-only memory (PROM). The more-significant address portions are shown at the left and the less-significant portions at the top. The memory contains eight tables in the present embodiment, each table consisting of two lines; the five least-significant address bits represent the position of the counter 46 of FIG. 3. A data "02" indicates "invalid", a data "00" indicates the detection of a narrow bar, and a data "01" indicates the detection of a wide bar. For the first table a narrow bar may lead to a count of 1–3, a wide bar to a count of 4-B (=11). For the last table a narrow bar may lead to a count 4−D (=13), a wide bar to a count HEX11 (=17)–HEX1E (=30). For other codes other choices can be made. For the code described herein alternatives are also feasible. Notably for the later tables there are three regions in which no valid widths occur; thus, for the last table but one, the counts 0-2; 0B-0C; 1F (all HEX). In the present embodiment a tolerance factor of at least 30/17 exists for all nominal bar widths. It has been found that such a tolerance factor amounting to at least 1½ is usually sufficient. In given cases another lower limit may alternatively be chosen. For the addressing of the table, therefore, invariably an 8-bit address is supplied. The three most significant bits are supplied by the registers 72 of FIG. 3 in the described manner. Invariably two lines of the table are thus addressed together. The presentation of the three most significant bits is usually the same, for example when a series of products having the same dimensions of the code field is examined. When a new or deviating product is encountered, no or too few lines are found for correct validation. In that case a reselection of the appropriate table is performed by trial and error. If none of the table supplies a correct signal, an alarm is given by a device (not shown), for example an acoustic alarm. It is alternatively possible to address a plurality of tables simultaneously, for example in that the most significant address bit but two is a don't care bit. In that case the relevant circuit (notably the elements 58, 60, 66, 68) must be present once for each table addressed. In some cases this offers an improvement, for example when bar codes of different dimensions (number of bars and/or enlargement factor) occur in an intermingled fashion.

DESCRIPTION OF THE FLOWCHART

Figure 6:
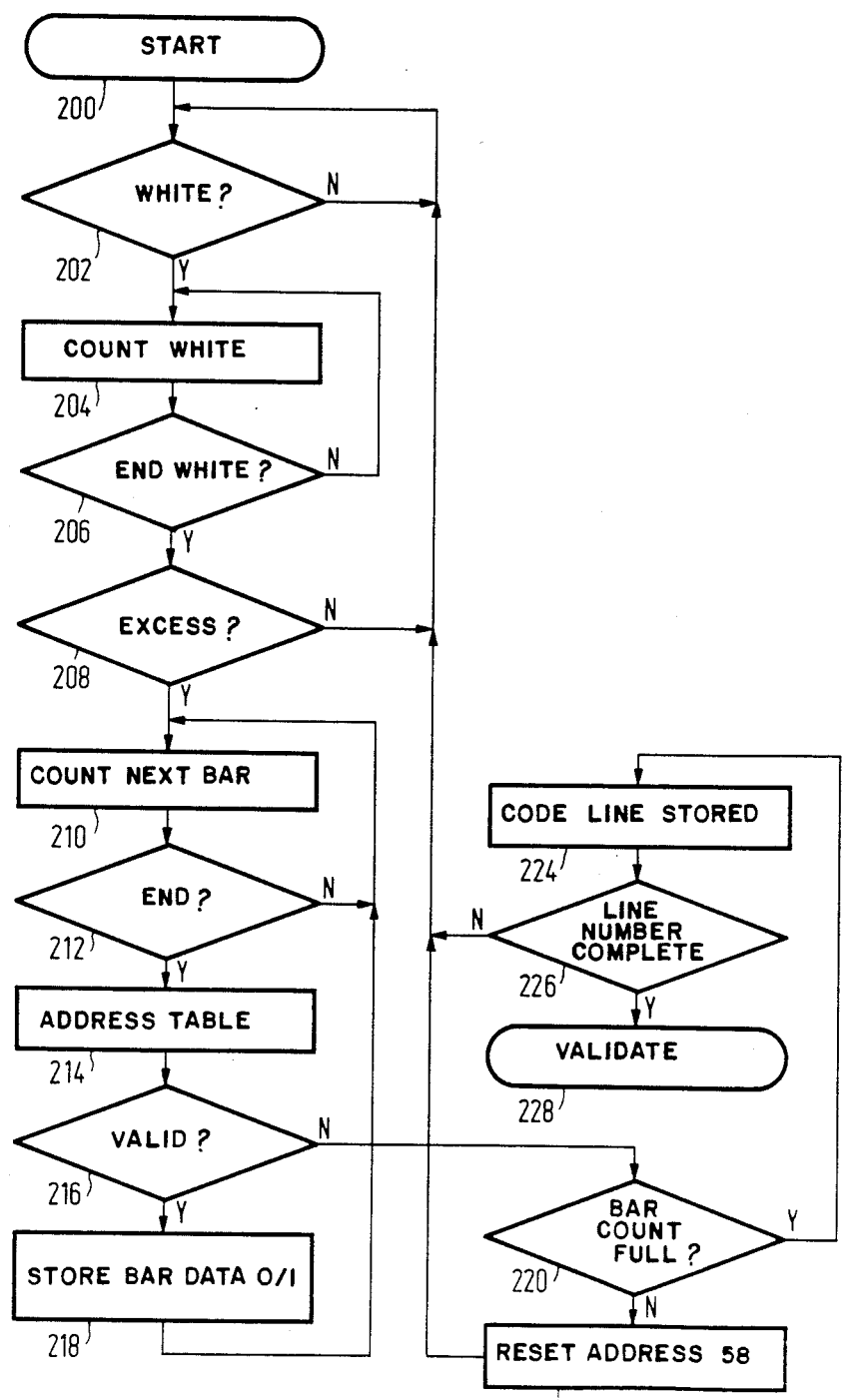
FIG. 6 shows a flowchart illustrating the operation of the code regenerator.

FIG. 6 shows a flowchart concerning the operation of the code regenerator. The process starts in block 200, for example by initialization of the registers and presentation of the described reset signals. Block 202 forms a waiting loop until a "white" portion of a scanning line is detected. In block 204 the length of the white interval is counted down until the end of the white portion is detected in block 206. When the interval has at least the "excess" width (test block 208), the detection of the bars may commence. If this is not the case, the system starts anew. The excess width is detected in the same manner as described for the table memory. The excess width is, for example twice the width of the widest nominal bar. In an attractive embodiment the detection of the wide white margin is even completely omitted; only bars of permissible width are detected, regardless of their black/white character; for as long as intervals are found whose width does not agree with the table, the counter 58 is continuously reset. In block 210 the width of the actual bar is counted until it is detected in block 212 that the bar has terminated. In block 214 the table memory is addressed. When a valid bar is concerned (test in block 216), the information of this bar is stored in the bar memory (block 218) and the next bar is counted. When the bar is invalid, it is tested in block 220 whether or not a sufficient number of bars has been detected. If this is not the case, the address of the bar counter is reset (block 222) and the procedure is started again. When a sufficient number of bars has been counted, a correct code line has been found (block 224) and it is tested yet whether a sufficient number of lines has been detected (test block 226). If this is not the case, the system starts to search for a next line with a code. When the test result in block 226 is positive, validation takes place (block 228).

TEXT IN FIG. 6

200: start
201: white?
204: count white
206: end white?
208: excess?
210: count next bar
212: end?
214: address table
216: valid?
218: store bar data 0/1
220: bar count full?
222: reset address 58
224: code line stored
226: line number complete?
228: validate.

What is claimed is:

1. A reading device for a bar code provided in/on a carrier, which reading device includes:
    a scanning device for line-wise scanning the bar code,
    a decision element which is connected to the scanning device in order to form a bivalent signal from the signal of the scanning device,
    a code regenerator which is connected to the decision element in order to form a code sequence consisting of valid bar widths from the lengths of successive intervals of the bivalent signal,
    a bar counter which is connected to an output of the code regenerator in order to count the number of valid bars, and
    an output element which is connected to the code regenerator in order to validate a code sequence and to present a validated code on a user output,
    characterized in that the code regenerator includes an address counter for a table memory which counts down the lengths of the intervals, the table memory identifying a valid bar width in the location thus addressed or indicating an invalid bar width, the table thus addressed having a validity range of at least two successive address counter positions for each nominal bar width, the address range of the table memory covering at least two different sequences of consecutively successive invalid counter positions which are separated from one another by at least one sequence of valid counter positions, the table memory containing a sequence of at least two tables of increasing scale, for each table there being provided for each nominal bar width a tolerance range between a largest permissible actual bar width and a smallest permissible actual bar width, said tolerance range amounting to at least a factor 1½.

2. A reading device as claimed in claim 1, characterized in that bar widths are continuously detected, the bar counter being reset to a starting position per line under the control of an invalid bar width, said resetting being deactivated as soon as a predetermined bar counter position is reached.

3. A reading device as claimed in claim 1 or 2, characterized in that the scanning device is formed by a television camera for the pseudo-simultaneous scanning of of said at least four lines, the validation being activated under the control of a predetermined minimum number of valid scanning lines which is larger than one.

4. A reading device as claimed in claim 3, characterized in that the output element is suitable to present at least two corresponding codes which are correct as regards contents as validated information on the user output.

5. Apparatus for reading a bar code comprising:
   a. means (20) for line-wise scanning the bar code;
   b. threshold means (44) fed by the scanning means for producing a binarized scanning signal, the binarized scanning signal comprising a plurality of transitions;
   c. means (46) for counting a clock signal, said counting means being resettable by said transitions, whereby an output signal of said counting means indicates a length of a time interval between successive transitions in said binarized signal;
   d. a bar width table memory (50) for storing a plurality of tables of bar width indications, comprising:
      i. location selection means comprising:
         A. means for reversibly selecting among said plurality of tables;
         B. means for addressing locations within respective tables, said addressing means being coupled to receive the output signal of said counting means as an address;
      ii. an output at which said bar width indications are provided from said tables under control of said transitions;
      iii. said bar width indications each being one of:
         A. a first acceptable bar width indication:
         B. a second acceptable bar width indication; and
         C. an unacceptable bar width indication;
      iv. each table having:
         A. a first address range corresponding to locations where said first acceptable bar width indication is stored;
         B. a second address range corresponding to locations where said second acceptable bar width indication is stored;
         C. at least third and fourth address ranges corresponding to locations where said unacceptable bar width indication is stored, the third and fourth address ranges being separated from each other by at least one of the first and second address ranges; and
      said first and second address ranges including respective lowest and highest address values corresponding to respective lowest and highest acceptable bar widths, the ratio of the respective lowest and highest acceptable bar widths being at least 1½, whereby the apparatus recognizes bar widths within a tolerance factor of 1½; and at least one of the tables having at least one of said third and fourth address ranges between said first and second address ranges,
      whereby bar widths are verified as soon as the bar widths are recognized;
   e. code regenerating means (60), fed by said bar width table, for progressively storing a sequence of valid bar width indications, under control of said transitions;
   f. a bar counter (58) for counting said transitions; and
   g. an output element (66) fed by said code regenerator for providing a valid output code, under control of a predetermined count value of said bar counter.

6. The apparatus of claim 5 wherein the bar counter is resettable to a line start position under control of the bar width indication, so that the bar counter is reset when the bar width indication indicates an invalid bar width when a predetermined bar count has not been reached.

7. A reading device as claimed in claims 5 or 6, characterized in that the decision element includes a multiplexed input whereto at least two scanning devices can be selectively connected.

8. A reading device as claimed in claims 5 or 6, characterized in that said tables can be separately selected.

9. A reading device as claimed in claim 8, in which the scanning device is formed by a television camera, characterized in that there is provided a selector for the table memory which, in the absence of a validated code on the user output, selects a different table during a repeat scan of the code, but which maintains the selector position when a validated code is output.

10. A reading device as claimed in claim 9, characterized in that in a selector position a sub-set of tables which consists of at least two tables can be selected as a whole.

11. The apparatus of claim 5 wherein the scanning means is a television camera.

12. The apparatus of claim 11 wherein the television camera pseudo-simultaneously scans at least four lines, the apparatus further comprising means for validating said sequence of bar width indications under the control of a plurality of scanning lines.

13. The apparatus of claim 12 wherein the output element presents at least two corresponding sequences of bar width indications.

14. A method for reading bar codes comprising the steps of:
   a. scanning the bar code in a direction transverse to the bar code;
   b. forming a bivalent signal comprising a plurality of transitions between first and second levels, there being respective time intervals between successive transitions, whereby one of the levels represents black and the other represents white;
   c. first counting durations of said intervals to produce an interval duration count;
   d. selecting a table within a table memory;
   e. addressing the table using the interval duration count to provide a respective bar width validity indication, the table containing a plurality of bar width validity indications, the table including at least two sections for invalid bar width indications and at least two sections for valid bar width indications corresponding to respective valid bar widths, the highest and lowest respective valid bar widths, corresponding to the respective valid bar width sections, having a respective ratio of at least 1½;
   f. storing the bar width indication provided in step e.;
   g. repeating steps a. through f. until a predetermined number of valid bars is stored, the table used in at least one repeating of step e being such that one of the sections of invalid bar width indications corresponds to bar widths lying between the valid bar widths; and h. providing the stored bar width indication signals as an output code.

15. The method of claim 14 comprising the step of restarting if the bar width validity indication provided in step e. indicates an invalid bar width.

16. A bar code reading device comprising:
scanning means for line-wise scanning the bar code;
threshold means fed by the scanning means for producing a binarized scanning signal;
counter means for counting a clock signal and having reset means for being reset by a transition in said binarized scanning signal;
a bar width table memory for storing a plurality of tables, each table being addressable by said counter means for under control of said transition outputting a signal indicating a first acceptable bar width in a first address range thereof, a second acceptable bar width in a second address range thereof, or an unacceptable bar width in each of a third and a fourth address ranges thereof that are separated from each other by at least one of said first and second address ranges, wherein at least one table has at least one of said third and fourth address ranges between said first and second address ranges, wherein said first and second address ranges have a ratio of the least $1\frac{1}{2}$ between lowest and highest acceptable bar width therein, and wherein furthermore selection means are present for reversibly selecting among said plurality of tables;
code generating means fed by said bar width table for under control of each transition progressively storing a sequence of valid bar width indications;
a bar counter for counting said transitions;
and an output element fed by said code regenerator for under control of a predetermined bar count outputting said sequence of bar width indications.

* * * * *